US012643226B2

(12) United States Patent
Blumenschein et al.

(10) Patent No.: US 12,643,226 B2
(45) Date of Patent: Jun. 2, 2026

(54) PNEUMATIC SOFT ACTUATORS WITH TUNABLE FORCE-DISPLACEMENT RELATION AND METHODS AND MACHINES THEREFOR

(71) Applicant: Purdue Research Foundation, West Lafayette, IN (US)

(72) Inventors: Laura Helen Blumenschein, West Lafayette, IN (US); Sicheng Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 398 days.

(21) Appl. No.: 18/321,505

(22) Filed: May 22, 2023

(65) Prior Publication Data

US 2023/0373082 A1 Nov. 23, 2023

Related U.S. Application Data

(60) Provisional application No. 63/344,598, filed on May 22, 2022.

(51) Int. Cl.
B25J 9/14 (2006.01)
B25J 9/10 (2006.01)

(52) U.S. Cl.
CPC ............. B25J 9/142 (2013.01); B25J 9/1075 (2013.01)

(58) Field of Classification Search
CPC .. B25J 9/1075; B25J 9/142; F15B 2211/8855; F15B 15/103
See application file for complete search history.

(56) References Cited

U.S. PATENT DOCUMENTS

2014/0109560 A1* 4/2014 Ilievski .................. B25J 9/1075
60/484
2021/0370493 A1* 12/2021 Samia ...................... B25J 9/142

FOREIGN PATENT DOCUMENTS

WO WO-2020161441 A1 * 8/2020 .............. B25J 9/142

OTHER PUBLICATIONS

Daerden, Frank, et al., "The Concept and Design of Pleated Pneumatic Artificial Muscles", International Journal of Fluid Power 2 (2001) No. 3 pp. 41-50.

(Continued)

*Primary Examiner* — Nathaniel E Wiehe
*Assistant Examiner* — Daniel S Collins
(74) *Attorney, Agent, or Firm* — Hartman Global IP Law; Gary M. Hartman; Domenica N.S. Hartman

(57) ABSTRACT

Pneumatic soft actuators, and methods and machines capable of modifying their performance and mechanical characteristics. Such a pneumatic soft actuator can be used to connect mechanical components and include an inflatable pouch formed by an airtight, flexible, non-stretchable membrane. The inflatable pouch has oppositely-disposed ends adapted to couple to the mechanical components, and has two lateral edges in which symmetrical folds are formed and define end geometries at the ends of the inflatable pouch. Inflation and deflation of the inflatable pouch increases and decreases, respectively, a distance between the ends of the inflatable pouch to induce relative motion between the mechanical components coupled to the ends of the inflatable pouch.

11 Claims, 7 Drawing Sheets

(56)　　　　　　References Cited

OTHER PUBLICATIONS

Greer, Joseph D., et al., "Series Pneumatic Artificial Muscles (SPAMs) and Application to a Soft Continuum Robot", 2017 IEEE International Conference on Robotics and Automatoin (ICRA) Singapore, May 29-Jun. 3, 2017, pp. 5503-5510.

Kubler, Alexander M. et al., "A Multi-Segment, Soft Growing Robot with Selective Steering", 2023 IEEE International Conference on Soft Robotics (RoaboSoft) 979-8-3503-3222-3, pp. (7).

Naclerio, Nicholas D. et al., "Simple, Low-Hysteresis, Foldable, Fabric Pneumatic Artificial Muscle", IEEE Robotics and Automation Letters, vol. 5, No. 2, Apr. 2020, pp. 3406-3413.

Niiyama, Ryuma et al., "Pouch Motors: Printable Soft Actuators Integrated with Computational Design", Soft Robotics, vol. 2, No. 2., (2015), pp. 59-71.

\* cited by examiner

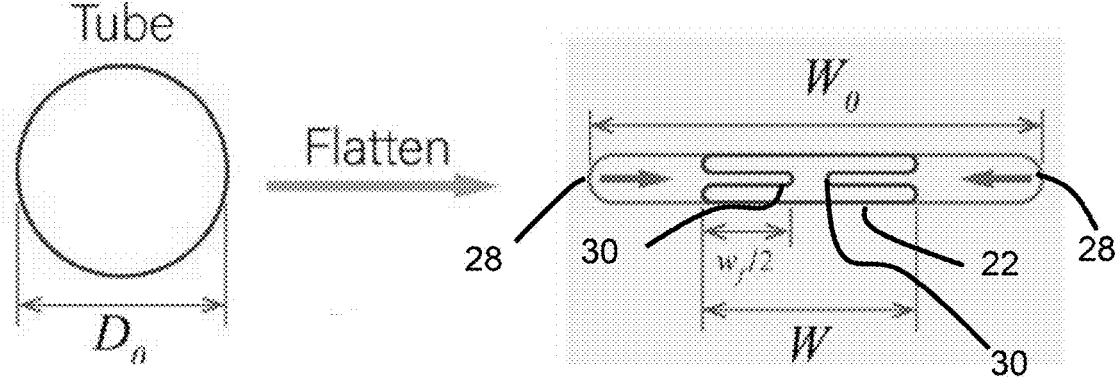
FIG. 2A
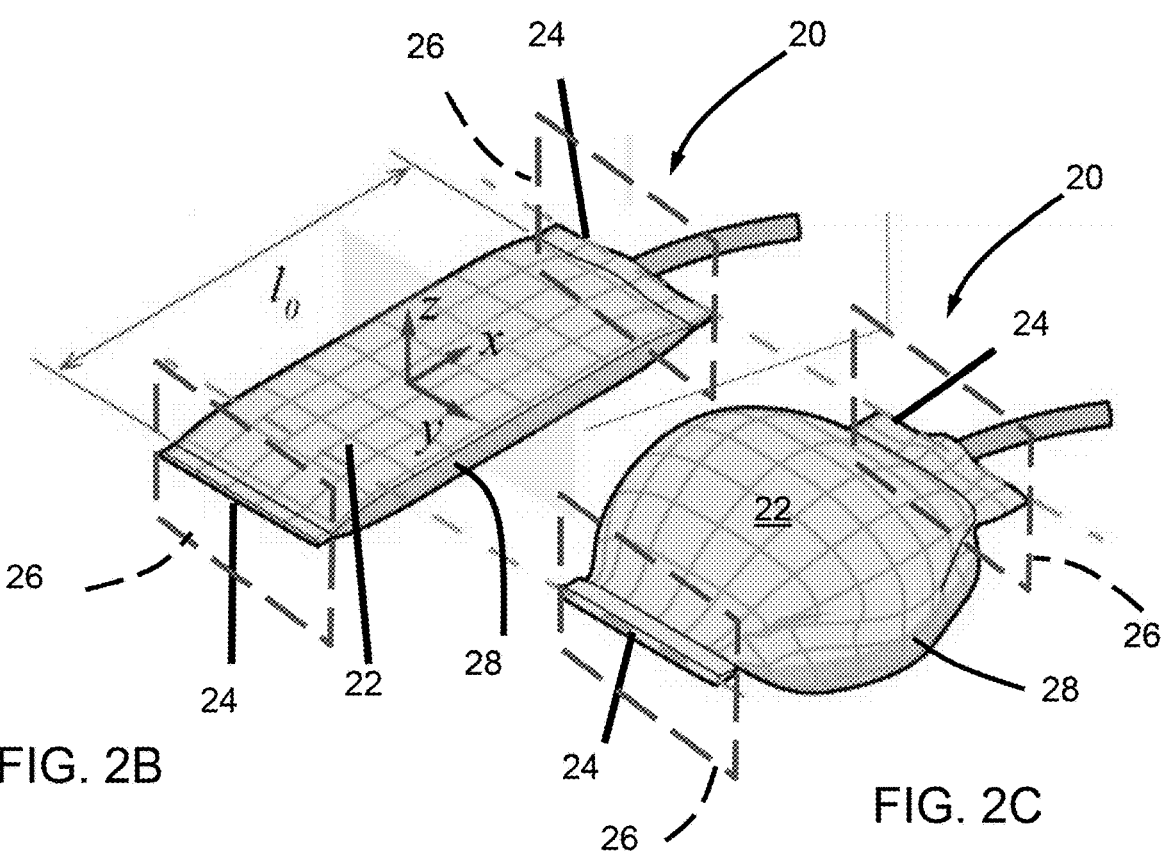
FIG. 2B
FIG. 2C

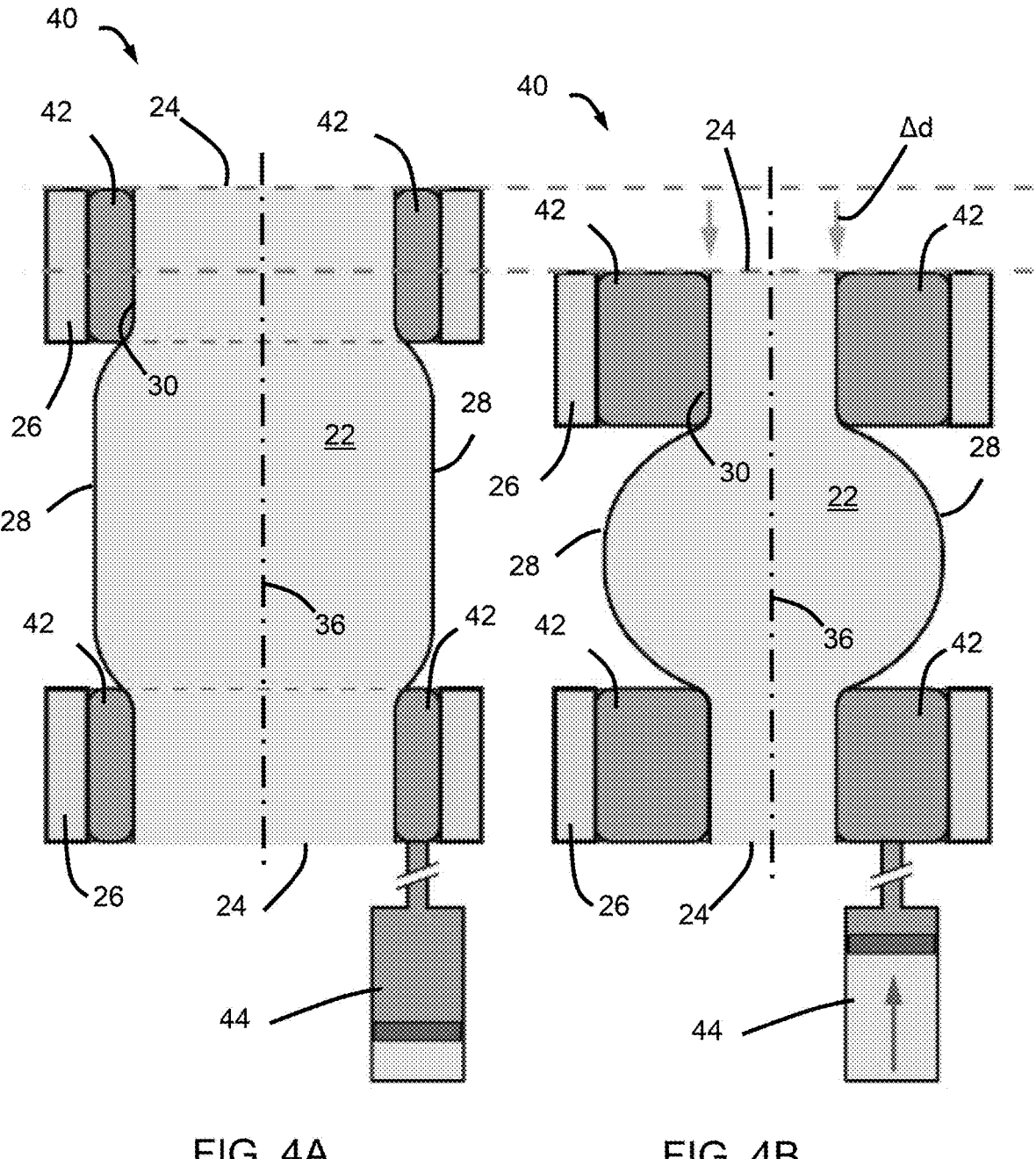
FIG. 4A                    FIG. 4B

PNEUMATIC SOFT ACTUATORS WITH TUNABLE FORCE-DISPLACEMENT RELATION AND METHODS AND MACHINES THEREFOR

CROSS-REFERENCE TO RELATED APPLICATIONS

This application claims the benefit of U.S. Provisional Application No. 63/344,598, filed May 22, 2022, the contents of which are incorporated herein by reference.

BACKGROUND OF THE INVENTION

The present invention generally relates to soft actuators and robotics. The invention particularly relates to pneumatic soft actuators and methods capable of modifying their performance and mechanical characteristics.

Pneumatic soft actuators and soft robots equipped with one or more soft actuators have found application in situations where delicate interaction with the environment is required. Such actuators and robots have seen use in tasks such as gently gripping items and moving through unstructured environments. Pneumatic artificial muscles (PAMs) are one such pneumatic soft actuator. PAMs are linear actuators powered by air pressure to extend and/or contract along some longitudinal direction in order to produce a displacement, twist, or other motion in a mechanical component attached thereto, with the ability to imitate the human musculo-skeletal system, human muscle function, and the motion of human bodies. Typically, the motion is achieved by the contraction of the PAM along its length followed by an expansion.

PAMs function by pressured air filling a pneumatic pouch. As schematically represented in FIG. 1, a pouch 12 of a PAM (actuator) 10 is attached at its opposite ends 14 to mechanical components 16 which couple the PAM 10 to a larger mechanical structure (not shown) within which the PAM 10 is intended to function and to one or more mechanical elements of the mechanical structure that the PAM 10 is intended to set in motion. The pouch 12 is typically composed of some flexible, non-stretchable material such that it retains a constant surface area as its shape changes when inflated. For this reason, the material of the pouch 12 may comprise woven reinforcement fibers. The pouch 12 is shaped such that, as it fills with air, it expands at its midsection, achieving an ovoid shape while retaining an equivalent surface area. As a result, as the pouch 12 fills with air, it draws its ends 14 attached to the mechanical components 16, thereby drawing the mechanical components 16 together in a contraction motion roughly approximating the mechanism by which muscles contract and draw biological structural elements together. The pouch 12 is roughly analogous to a muscle and the mechanical components 16 are elements of a mechanical structure that is analogous to a skeletal system. While such analogies help to explain the construction and function of a PAM and describe common uses thereof, they do not represent the only possible applications for PAMs.

PAMs provide significant advantages when used as artificial muscles and as actuators in general. Because their main element is a thin membrane filled with air, PAMs are lightweight relative to more conventional mechanical actuators. A PAM can be directly connected to a structure it is intended to move. Additionally, PAMs are inherently mechanically compliant. Because their pouches are typically filled with compressible (albeit pressurized) air or gas, PAMs "give in" to a degree when a force is exerted on them, displacing to some degree. This compliance is an important feature when the PAM is used as an actuator in a machine or robot that interacts with or replicates the human anatomy, is exposed to unpredictable forces along its direction of motion, or is used in delicate operations. PAMs therefore allow both precise control of the force they apply as well as compliance with objects or environments to which they apply that force, two critical advantages that are desirably retained as PAMs continue to find applications in the aforementioned scenarios.

The motion and force generated by a PAM is a product of the pressure within the pouch as well as the state of inflation. The relationship between force and extension in a PAM mirrors the relationship between length and tension found in biological muscles. The mathematical model that describes the motion of a PAM as a function of inflation and pressure is non-linear because the three-dimensional expansion of the pouch drives the one-dimensional motion of the actuator, allowing for greater precision and control than in strictly linear mechanical actuators.

However, conventional PAMs have been associated with certain disadvantages. Similar to biological muscles, where the connection between muscle tissue and bones represents a likely point of tear or failure, the connection between the pouch of a PAM and the mechanical components it is intended to move and the strength of the connection represents concentrations of tension and a potential point of failure or rupture due to fatigue or overinflation of the pouch. As a result, the geometry of the connection between the pouch and the mechanical components has an effect on the robustness of the connection and commensurately the performance of the overall PAM.

This connection geometry also determines performance characteristics of the PAM. It has been experimentally demonstrated that the shape of the connection between the pouch and the mechanical components the PAM intended to move has an effect on the contraction or strain, strain being defined herein as the distance traveled by one end of the PAM relative to the other end, i.e., relative to the original length of the PAM. This effect occurs while holding other variables constant, such as the construction and material of the pouch.

Additionally, the relationship of the longitudinal extension and contraction to the pouch inflation and pressure is almost entirely a function of the geometry and composition of the pouch and its connection to the mechanical components the PAM is intended to move. This is known as the force/displacement relationship of the PAM. The retraction strength of a PAM is limited by the sum total strength pouch, which in the case of a woven pouch is dependent on the individual fibers of the pouch. The extension distance is similarly limited by the properties of the fibers that compose a woven pouch. As a result, once constructed, the motion and mechanical properties of a PAM are unalterable without changing the pouch composition, which may be costly or infeasible depending on the application.

In view of the above, it can be appreciated that there are certain limitations associated with pneumatic soft actuators, such as the difficulty in modifying the mechanical characteristics of an actuator once it is constructed and limitations associated with the pouch-structure connection. It would be desirable to provide a means of modifying the mechanical performance of pneumatic soft actuators without necessitating modifications to components or structures of the actuators themselves.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, pneumatic soft actuators and methods and machines capable of modifying their performance and mechanical characteristics.

According to a nonlimiting aspect of the invention, a pneumatic soft actuator connects two mechanical components. The pneumatic soft actuator includes an inflatable pouch formed by an airtight, flexible, non-stretchable membrane. The inflatable pouch has oppositely-disposed ends adapted to couple to the mechanical components, and has two lateral edges in which symmetrical folds are formed and define end geometries at the ends of the inflatable pouch. Inflation and deflation of the inflatable pouch decreases and increases, respectively, a distance between the ends of the inflatable pouch to induce relative motion between the mechanical components coupled to the ends of the inflatable pouch.

According to another nonlimiting aspect of the present invention, a method is provided for actively modifying the end geometry in a first end of the ends of the inflatable pouch. The method includes placing the first end of the inflatable pouch into a slot within an airtight enclosure, routing a branched tendon through openings in the slot and affixing branches of the branched tendon to a different one of the edges of the inflatable pouch, connecting the branched tendon to a spool, and rotating the spool such that the branches of the branched tendon pull the edges laterally towards each other to produce the end geometry comprising the symmetrical folds at the first end of the inflatable pouch.

According to yet another nonlimiting aspect of the invention, a variable folding machine is provided for performing a method as described above.

Technical aspects of actuators, methods, and machines as described above preferably include the ability to modify the mechanical characteristics of an actuator once it is constructed, without necessitating modifications to components or structures of the actuator itself.

Other aspects and advantages will be appreciated from the following detailed description and drawings.

BRIEF DESCRIPTION OF THE SEVERAL VIEWS OF THE DRAWING

FIG. 2A represents the fabrication of a folded pouch of a pneumatic soft actuator, and FIGS. 2B and 2C schematically represent the folded pouch of FIG. 2A in a deflated state (FIG. 2B) and an inflated state (FIG. 2C).

FIGS. 4A and 4B schematically represent plan views of a folded pouch and a mechanism by which connection geometries at ends of the pouch can be actively modified to induce a change in the force-strain relationship of the pouch and change the displacement that the pouch produces in mechanical components attached thereto.

DETAILED DESCRIPTION OF THE INVENTION

The intended purpose of the following detailed description of the invention and the phraseology and terminology employed therein is to describe one or more nonlimiting embodiments of the invention, and to describe certain but not all aspects of the embodiments to which the drawings relate. The following detailed description also describes certain investigations relating to the embodiments. As nonlimiting examples, the invention encompasses additional or alternative embodiments in which one or more features or aspects described as part of a particular embodiment could be eliminated and also encompasses additional or alternative embodiments that combine two or more features or aspects described as part of different embodiments. Therefore, the appended claims, and not the detailed description, are intended to particularly point out subject matter regarded to be aspects of the invention, including certain but not necessarily all of the aspects and alternatives described in the detailed description.

Figure 1:
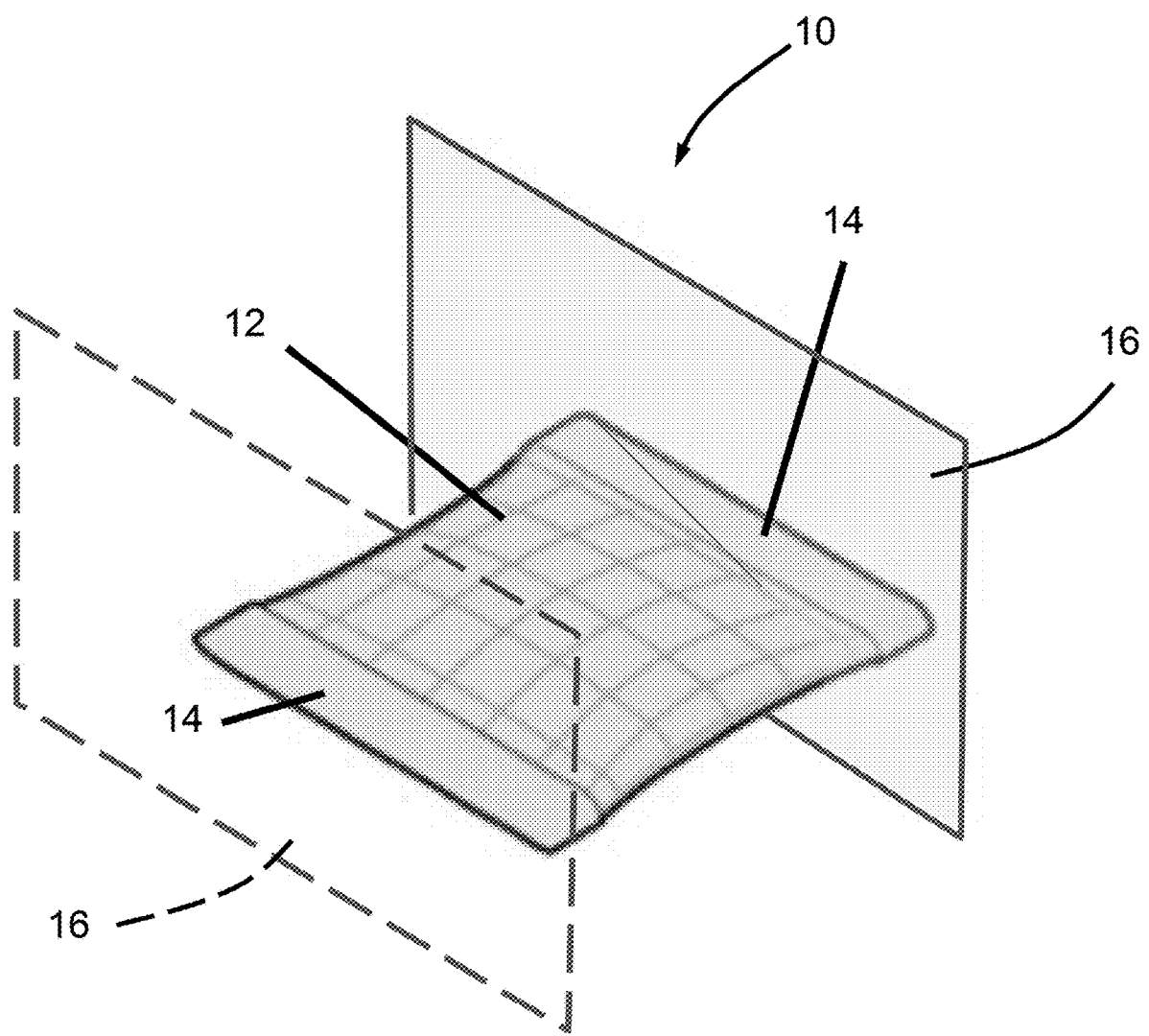
FIG. 1 schematically represents a pneumatic soft actuator comprising a pouch coupled to mechanical components.

FIGS. 2A through 7 depict various aspects of a folded pneumatic soft actuator 20, also referred to herein as a pneumatic artificial muscle (PAM), with variable end geometries. The actuator 20 comprises an inflatable pouch 22 coupled at opposite ends 24 thereof to structural or mechanical elements, referred to herein as mechanical components 26, that may be components of a larger mechanical structure (not shown). Similar to the actuator 10 shown in FIG. 1, inflation and deflation of the pouch 22 of the actuator 20 increases and decreases, respectively, the distance between the ends 24 of the pouch 22, thereby increasing (extending) and decreasing (contracting) the distance between the mechanical components 26 thereby producing motion in the mechanical structure. The actuator 20 represented in FIGS. 2A through 4B differs from the actuator 10 of FIG. 1 at least in part by varying the end geometries, namely, the widths of the ends 24 of the pouch 22, in manners capable of tuning the force and strain of the pouch 22 during inflation and deflation, enabling the range of motion in one or both mechanical components 26 to be modified and, in some cases, selectively controlled within a range established by the force-strain relationship of the pouch 22. Varying the end geometries of the pouch ends 24 results in modifications to the connection geometry between the pouch 22 and mechanical components 26, namely, the cross-sectional shape of the interface between the pouch 22 and each mechanical component 26. The end geometries of the ends 24 preferably, though not necessarily, affect the cross-sectional geometry of the pouch 22 throughout its length between the ends 24, such that the cross-sectional geometry of the pouch 22 throughout its length between the ends 24 is essentially identical to the end geometries at the ends 24. In the nonlimiting embodiments represented in the drawings, such as FIGS. 2A through 2C, the widths of the ends 24 of the pouch 22 are modified by the creation of folds 30 in both oppositely-disposed lateral edges 28 of the pouch 22, preferably creating a geometry that is symmetrical relative to the centerline (longitudinal axis) of the pouch 22.

The mechanical effects produced in existing actuators (e.g., the actuator 10 of FIG. 1) are limited by the materials and construction of the inflatable pouches and control is limited to the inflation and deflation of the pouch. By changing the geometry of the connection between the pouch 22 and each mechanical component 26 and the cross section of the pouch 22 therebetween, additional effects can be achieved regarding the range of motion and the force/displacement relationship of the pouch 22, resulting in greater control over the actuator 20 and greater precision in the movements of the mechanical components 26 to which it is connected. This provides significant advantages in its applications, as pneumatic soft actuators are commonly used in robotics to handle delicate items or move across potentially adverse terrain.

The pouch 22 may be fabricated from virtually any air-tight, thin-film, relatively inextensible material. A non-limiting example is a pouch 22 fabricated from a silicone-impregnated nylon fabric material having a thickness of about 70 micrometers.

In the nonlimiting embodiment represented in FIGS. 2A through 2C, the inflatable pouch 22 of the folded pneumatic soft actuator 20 has a rectangular shape. The pouch 22 is schematically represented as coupled to two mechanical components 26 at either end 14 of its centerline, and the folds 30 are symmetrical in size and shape. The proportion of the pouch 22 that is folded affects the force-strain relation of the actuator 20, allowing its behavior to be selectively controlled by the geometry of the folds 30. Mechanisms that adjust the folding of the pouch 22 can thereby modify the force-strain characteristics of the pouch 22 and modify the range of motion of the actuator 20.

FIG. 2A schematically represents the pouch 22 and its folds 30 being produced from a tube having a diameter Do. Immediately after flattening the tube, the unfolded geometry of the pouch 22 has a width $W_0$. FIG. 2A further illustrates the results of the pouch 22 undergoing a folding operation, in which a single fold 30 is produced in each lateral edge 28 of the pouch 22 between the upper and lower surfaces of the pouch 22. Each fold 30 has a width $w_f/2$, such that the total fold width is $w_f$ and the resulting folded cross-sectional geometry of the pouch 22 has a folded width of W, where $W=W_0-2w_f$.

FIGS. 2B and 2C represent perspective views of the actuator 20 of FIG. 2A with the pouch 22 in a deflated state (FIG. 2B) and an inflated state (FIG. 2C), illustrating the manner by the actuator 20 is able to induce mechanical displacement of the components 26 attached to the ends 24 of the pouch 22. The uninflated pouch 22 in FIG. 2B has an uninflated length, $l_0$, and width, $W_0$. The length of the pouch 22 is approximately equal to the displacement between each end 14 of the pouch 22 and the mechanical components 26 to which the ends 24 of the pouch 22 are attached. Upon inflation, the displacement between the ends 24 of the pouch 22 becomes an inflated length, l, where l is less than the uninflated length, $l_0$. The difference between the inflated length l and the uninflated length $l_0$ is the distance the actuator 20 has displaced the mechanical components 26.

Figure 3A:
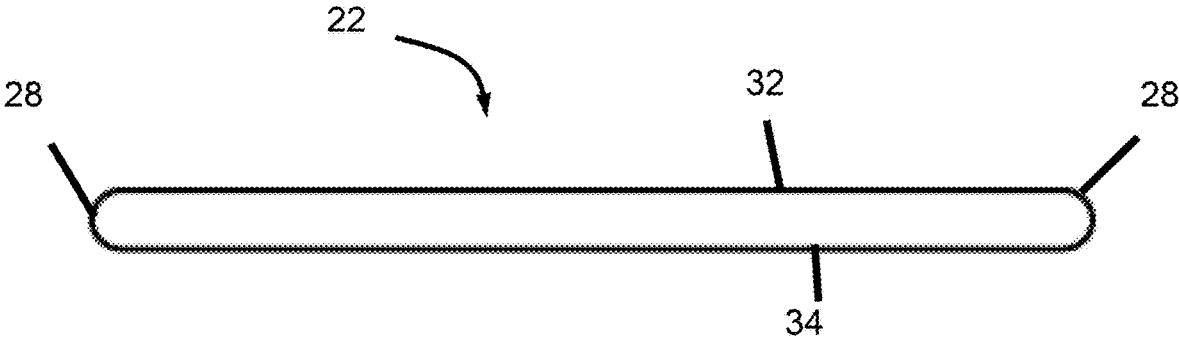
FIGS. 3a through 3C represent cross-sectional views of an unfolded pouch and two differently-configured folded pouches.
Figure 3B:
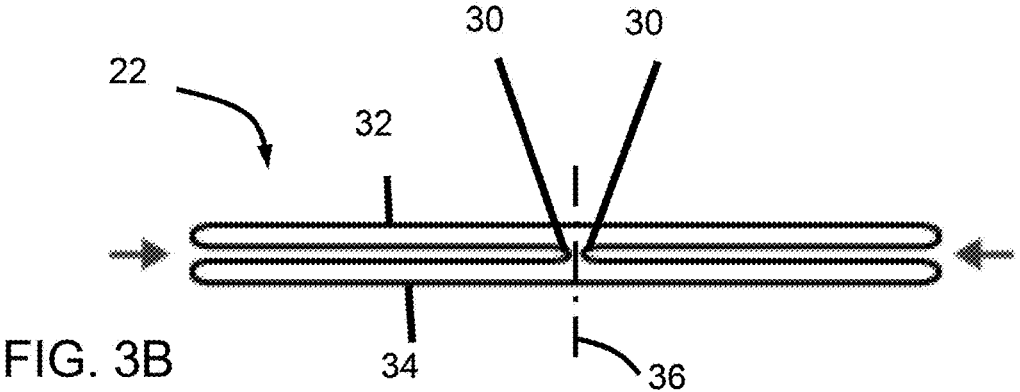
Figure 3C:
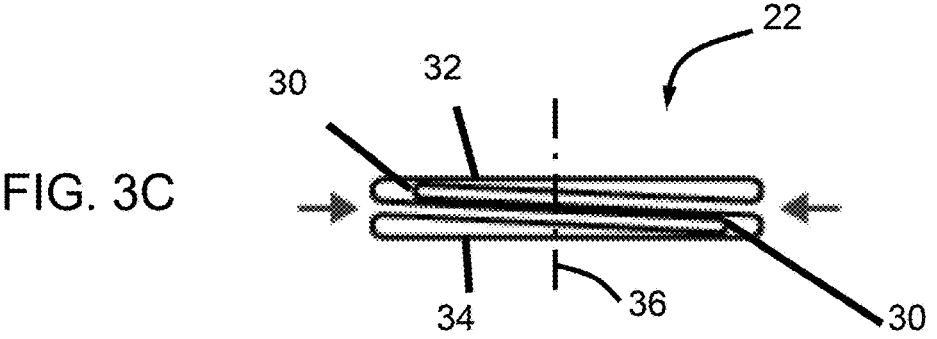

FIGS. 3A through 3C represent, respectively, cross-sectional views of an unfolded pouch 22, a folded pouch 22 whose symmetrical single folds 30 are equidistant from the upper and lower surfaces 32 and 34 and extend toward but not to the longitudinal centerline 36 of the pouch 22 so as to nearly meet at the centerline 36, and a folded pouch 22 whose symmetrical folds 30 extend beyond the centerline 36 of the pouch 22. In FIG. 3B, the lateral folds 30 draw the edges 28 towards each other within the cross-section of the pouch 22, whereas in FIG. 3C, the lateral folds 30 are drawn past each other within the cross-section of the pouch 22. The single fold 30 on each edge 28 of the cross-sectional geometry can be defined by a fold ratio, $w_f/W_0$. In one nonlimiting embodiment of the configuration shown in FIG. 3B, a fold ratio of 0.67 was experimentally obtained. In a nonlimiting embodiment of the configuration shown in FIG. 3C, a fold ratio of 0.8 was experimentally obtained.

FIGS. 4A and 4B schematically represent plan views of a folded pouch 22 and a folding mechanism 40 by which the connection geometry at the ends 24 of the pouch 22 can be actively modified to induce a change in the force-strain relationship of the pouch 22, including but not limited to the configurations of FIGS. 2A and 3B, and thereby change the displacement that the inflated pouch 22 produces in mechanical components 26 attached thereto when the pouch 22 is partially or fully inflated. The folding mechanism 40 comprises expandable members 42 that engage opposite lateral edges 28 of the pouch 22 and means for controlling expansion of the expandable members 42, in the nonlimiting example shown, a hydraulic or pneumatic cylinder 44 that controls the expansion of the members 42, so that the cylinder 44 can be utilized to cause the edges 28 at the ends 24 of the pouch 22 to be folded toward the centerline 36 of the pouch 22. In the examples shown, the pouch 22 is inflated and the members 42 are expanded to a greater degree in FIG. 4B than in FIG. 4A, resulting in the folds 30 extending farther toward the centerline 36 of the pouch 22 and altering the distance (ad) that the inflated pouch 22 displaces the mechanical components 26.

Figure 5:
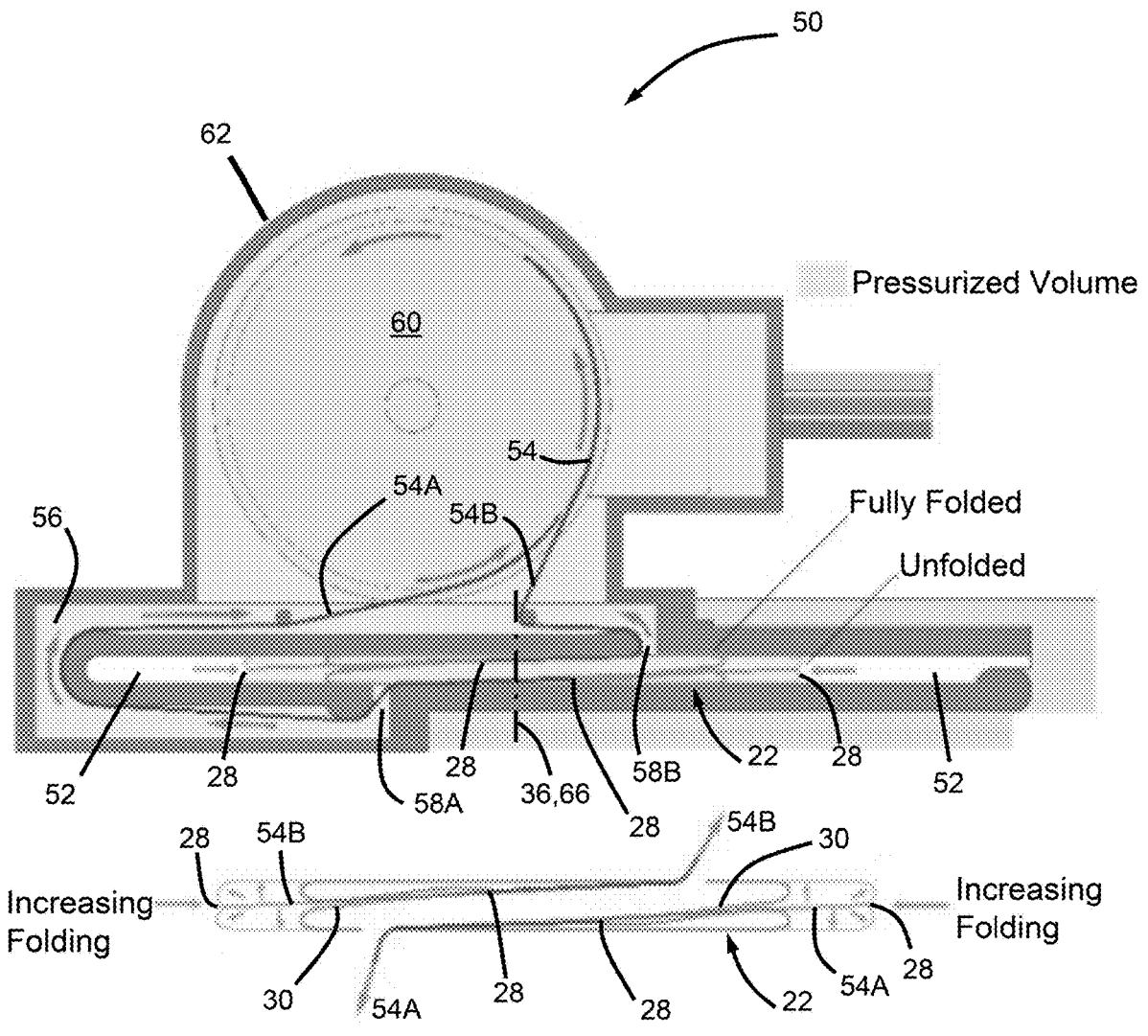
FIG. 5 schematically represents a cross-sectional view of another mechanism by which connection geometries at ends of a pouch can be actively modified, wherein a bottom image in FIG. 5 schematically represents a cross-sectional view of a pouch and its connections to the mechanism in isolation.
Figure 6:
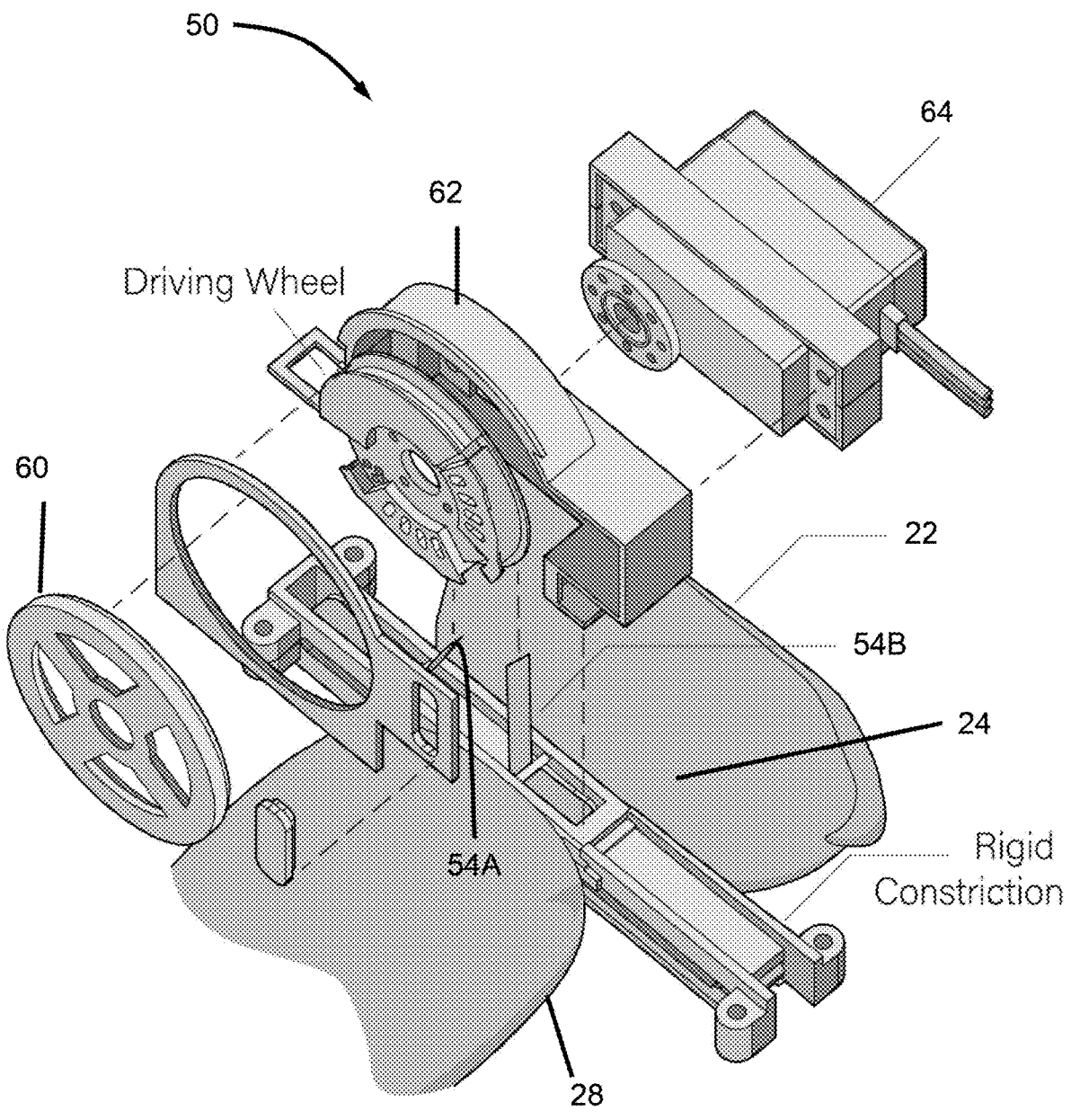
FIG. 6 schematically represents an exploded view of the mechanism of FIG. 5.
Figure 7:
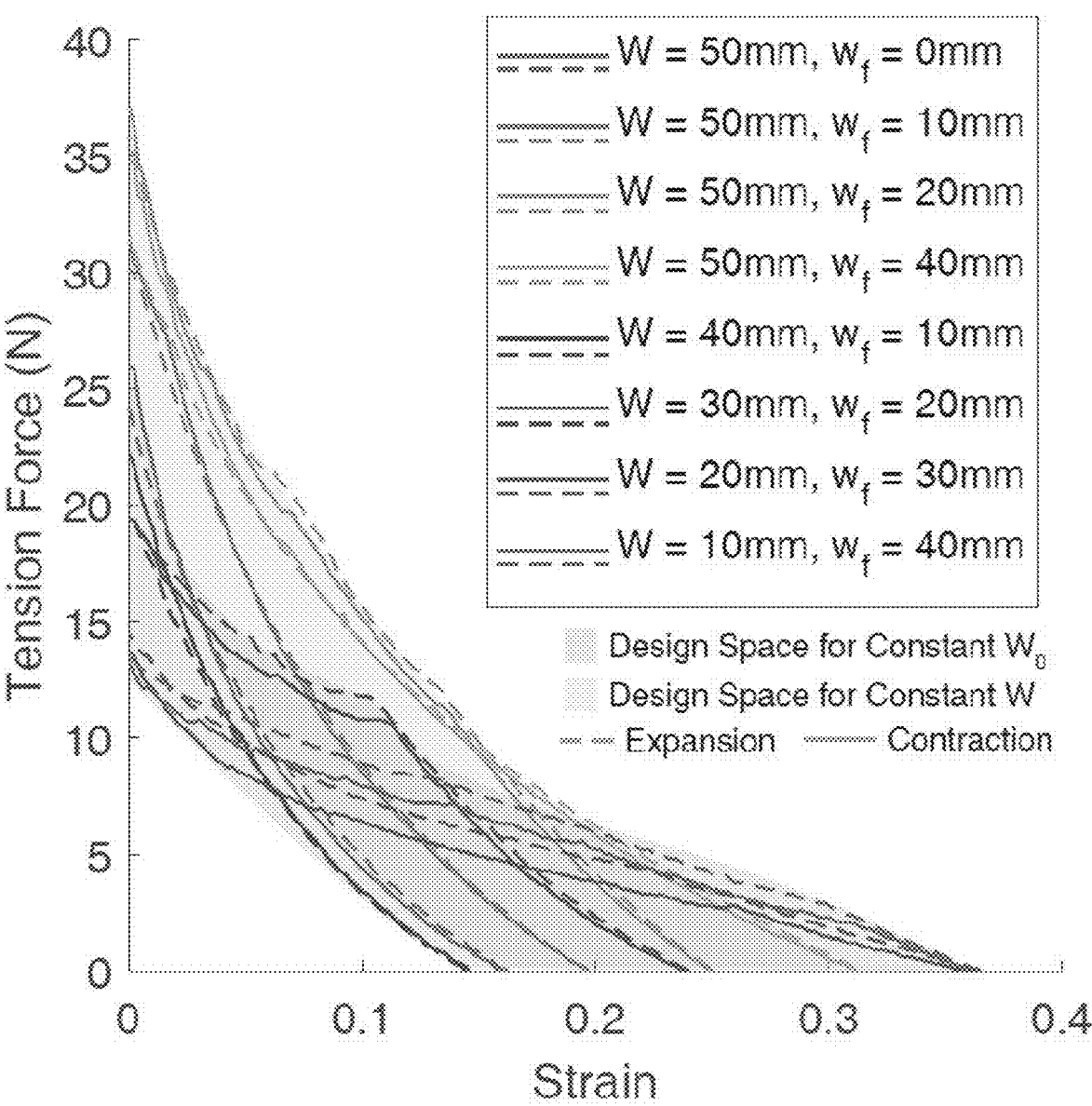
FIG. 7 is a graph representing force-strain relationships experimentally obtained for pouches.

FIGS. 5 and 6 schematically represent another folding mechanism by which the connection geometry at the ends 24 of the pouch 22 can be actively modified to induce a change in the force-strain relationship of the pouch 22 and change the displacement that the pouch 22 produces in mechanical components 26 attached thereto when the pouch 22 is partially or fully inflated. Connection geometries that can be acquired with the folding mechanism of FIGS. 5 and 6 include, but are not limited to, the configurations of FIGS. 2A, 3B and 3C. The folding mechanism is configured as a variable folding machine 50, one of which is preferably disposed at each end 24 of the pouch 22. The machine 50 is represented as comprising a slot 52 into which either end 24 of a pouch 22 may be inserted. The slot 52 further includes two openings 58A and 58B on opposite sides of a centerline 66 of the slot 52, which as shown essentially coincides with the centerline 36 of the pouch 22. A spool 60 is disposed adjacent the slot 52, and branches 54A and 54B of a branched tendon 54 connect the lateral edges 28 of the pouch 22 to the spool 60 through the openings 58A and 58B. In the orientation shown in FIG. 5, one branch 54A of the tendon 54 is connected to the edge 28 on the right side of the pouch 22 through a channel 56 and the opening 58A, and the remaining branch 54B of the tendon 54 is connected to the edge 28 on the left side of the pouch 22 through the opening 58B. The aforementioned components are contained within a rigid airtight enclosure 62 that can be pressurized so as to also pressurize and inflate the pouch 22 within the slot 52 of the machine 50. In FIG. 6, an end 24 of the pouch 22 can be seen as inserted through the slot 52 and protruding beyond the slot 52. A servo motor 64 is provided to actuate the spool 38. The servo motor 64 may be controlled by an automatic feedback control program to control the folding operation as driven by the spool 60, such that the extent of each fold 30 can be selectively controlled to achieve a desired force-strain relationship for the pouch 22.

The machine 50 may perform a folding method on a pouch 22 by placing an end 24 of the pouch 22 into the slot 52 and affixing the branches 54A and 54B of the tendon 54 to the lateral edges 28 of the pouch 22, wherein each branch 54A and 54B is affixed to a different edge 28 of the pouch 22. As noted above, the branch 54A is routed through the channel 56 and the opening 58A and the branch 54B is routed through the opening 58B, wherein the opening 58A/58B through which each branch 54A/54B is routed is oppositely-disposed from the edge 28 to which the branch 54A/54B is connected. The end of the tendon 54 opposite the branches 54A and 54B is then affixed to the spool 60, which is rotated to symmetrically pull the branches 54A and 54B of the tendon 54 and the edges 28 of the pouch 22 to which they are attached towards the opposite opening 58A and 58B and the opposite edge 28, thereby producing symmetrical folds 30 in the edges 28 in the direction of the centerline 36 of the pouch 22. The interior of the pouch 22 is pressurized along with the interior of the enclosure 62, thereby allowing the branches 54A and 54B to pull the edges 28 of the pouch 22 from within the cross-sectional space defined by the pouch 22 while the pouch 22 is inflated.

In experimental investigations conducted, sample pouches were fabricated including folded pouches having an uninflated length ($l_0$) of 50 mm and either a constant unfolded width ($W_0$) of 50 mm or a constant folded width (W) of 50 mm. Measurements were made for incremental changes of 10 mm in total fold width ($w_f$) among the samples. Force-strain curves for the samples were obtained with a force gauge mounted on a motorized travelling test stand. A pressure supplied of 13.8 kPa was applied to the samples for all tests performed. The samples were initially pressured at the zero-strain, maximum force state and compressed until the maximum strain, zero-force state was reached. The motion was then reversed to allow the sample pouches to return to the initial state. Displacement and force were recorded during the motion to obtain force-strain curves shown in FIG. 7, which evidences how the force/displacement curve for the samples were able to be varied through changes in the end geometries of the pouches. Ideally, the force and strain of a pneumatic soft actuator (e.g., a PAM) has a one-on-one mapping relation at a given pressure, which is intrinsically determined by the geometry and material of the pouch, resulting in a curve in the plane spanned by axes representing force and strain. In practice, this one-on-one mapping is often compromised by effects such as hysteresis, i.e., the force generated by the pouch is different from time to time, for example due to local permanent deformations.

As previously noted above, though the foregoing detailed description describes certain aspects of one or more particular embodiments of the invention and investigations associated with the invention, alternatives could be adopted by one skilled in the art. For example, the folded pneumatic soft actuator 20, variable folding machine and their components could differ in appearance and construction from the embodiments described herein and shown in the drawings, functions of certain components of the either device could be performed by components of different construction but capable of a similar (though not necessarily equivalent) function appropriate materials could be substituted for those noted in the fabrication of the present invention and its components. As such, and again as was previously noted, it should be understood that the invention is not necessarily limited to any particular embodiment described herein or illustrated by the drawings.

The invention claimed is:

1. A pneumatic soft actuator connecting two mechanical components, the pneumatic soft actuator comprising:
   an inflatable pouch formed by an airtight, flexible, non-stretchable membrane, the inflatable pouch having oppositely-disposed ends adapted to couple to the mechanical components, and having two lateral edges in which symmetrical folds are formed and define end geometries at the ends of the inflatable pouch;
   wherein inflation and deflation of the inflatable pouch decreases and increases, respectively, a distance between the ends of the inflatable pouch to induce relative motion between the mechanical components coupled to the ends of the inflatable pouch; and
   wherein the end geometries comprise a single fold in each of the lateral edges of the inflatable pouch.

2. The pneumatic soft actuator of claim 1, wherein the symmetrical folds extend toward but not to a longitudinal centerline of the inflatable pouch.

3. A pneumatic soft actuator connecting two mechanical components, the pneumatic soft actuator comprising:
   an inflatable pouch formed by an airtight, flexible, non-stretchable membrane, the inflatable pouch having oppositely-disposed ends adapted to couple to the mechanical components, and having two lateral edges in which symmetrical folds are formed and define end geometries at the ends of the inflatable pouch;
   wherein inflation and deflation of the inflatable pouch decreases and increases, respectively, a distance between the ends of the inflatable pouch to induce relative motion between the mechanical components coupled to the ends of the inflatable pouch; and
   wherein the symmetrical folds each extends beyond a longitudinal centerline of the pouch.

4. A pneumatic soft actuator connecting two mechanical components, the pneumatic soft actuator comprising:
   an inflatable pouch formed by an airtight, flexible, non-stretchable membrane, the inflatable pouch having oppositely-disposed ends adapted to couple to the mechanical components, and having two lateral edges in which symmetrical folds are formed and define end geometries at the ends of the inflatable pouch;
   wherein inflation and deflation of the inflatable pouch decreases and increases, respectively, a distance between the ends of the inflatable pouch to induce relative motion between the mechanical components coupled to the ends of the inflatable pouch; and
   wherein the end geometries at the ends of the inflatable pouch are variable so as to actively modify the end geometries to induce a change in a force-strain relationship of the inflatable pouch and modify the distance between the ends of the inflatable pouch when inflated and deflated.

5. The pneumatic soft actuator of claim 1, wherein the inflatable pouch has a cross-sectional geometry throughout a length thereof between the ends that is symmetrical relative to a longitudinal centerline of the pouch.

6. The pneumatic soft actuator of claim 1, wherein the inflatable pouch has a fold ratio of up to 0.67, and the fold ratio is defined as a total folded width of the inflatable pouch divided by an unfolded width of the inflatable pouch.

7. The pneumatic soft actuator of claim 1, wherein the inflatable pouch has a fold ratio of up to 0.8, and the fold ratio is defined as a total folded width of the inflatable pouch divided by an unfolded width of the inflatable pouch.

8. The pneumatic soft actuator of claim 1, wherein the inflatable pouch is rectangular shape.

9. A pneumatic soft actuator connecting two mechanical components, the pneumatic soft actuator comprising:

an inflatable pouch formed by an airtight, flexible, non-stretchable membrane, the inflatable pouch having oppositely-disposed ends adapted to couple to the mechanical components, and having two lateral edges in which symmetrical folds are formed and define end geometries at the ends of the inflatable pouch, wherein inflation and deflation of the inflatable pouch decreases and increases, respectively, a distance between the ends of the inflatable pouch to induce relative motion between the mechanical components coupled to the ends of the inflatable pouch; and a folding mechanism for actively modifying the end geometries at the ends of the inflatable pouch to induce a change in a force-strain relationship of the inflatable pouch and change the distance that the ends of the inflatable pouch are displaced when inflated and deflated.

10. The pneumatic soft actuator of claim 9, wherein the folding mechanism comprises:

expandable members that engage the lateral edges of the pouch at the ends thereof; and means for controlling expansion of the expandable members.

11. The pneumatic soft actuator of claim 10, wherein the folding mechanism comprises:

an airtight enclosure;

a slot within the airtight enclosure, the slot having openings on opposite sides of a centerline of the slot;

a spool adjacent the slot; and a branched tendon connected to the spool and having branches connected to the lateral edges of the inflatable pouch.

* * * * *